Patented Sept. 14, 1954

2,689,187

UNITED STATES PATENT OFFICE 2,689,187

METHOD AND COMPOSITIONS FOR FORMING NITROCELLULOSE FILMS

Soren M. Thomsen, Pennington, N. J., assignor to Radio Corporation of America, a corporation of Delaware No Drawing. Application September 29, 1951, Serial No. 249,011

11 Claims. (Cl. 106—184)

1

The present invention relates generally to an improved method of forming a film of nitrocellulose, including the step of spreading a solution of nitrocellulose over a water surface, and to improved compositions suitable for use in the improved method. More particularly, the invention relates to an improved method of forming a film of nitrocellulose over the phosphor screen of a cathode-ray tube where the nitrocellulose film is intended to have a bright film of aluminum deposited thereon.

Cathode-ray tubes having aluminized phosphor screens have been known for some time. Various methods of applying aluminum films in such tubes have been devised and have been used extensively. In general, it has been customary to cover the rough interior face of the phosphor screen with a film of nitrocellulose and then to deposit a thin layer of aluminum on top of the nitrocellulose film. When the process is properly carried out, the aluminum surface is bright and shiny, forming a good reflector for light, and when the nitrocellulose film is subsequently baked out of the tube, the aluminum remains as a satisfactory means for reflecting light generated within the phosphor, toward the face of the tube.

Previous methods of forming the phosphor screen and the superimposed nitrocellulose film have included the steps of settling the phosphor screen on the tube face and baking this in the usual manner. Then, the tube is partially filled with water. A few drops of a solution of nitrocellulose in a volatile solvent are placed on the water surface and a film of nitrocellulose is permitted to spread over the surface of the water while the solvent volatilizes rapidly. Later, the water layer is removed, either by siphoning or decantation and the film constituents are dried in an air stream. Finally, the aluminum is deposited over the nitrocellulose film and the tube is baked to remove all of the organic constituents of the films.

In the past, various solvents have been used for making up the solutions of nitrocellulose used to form the films upon which the aluminum was deposited. One of the most commonly used of these solvents was isoamyl acetate. The film-forming solution, for example comprised 5 per cent of 80-second viscosity grade nitrocellulose and the remainder solvent. One expedient for improving the spreading characteristics of this solution was to drop a small amount of the solvent onto the water surface in order to presaturate the air and water surface with the solvent

2 and then to add a few drops of the nitrocellulose solution. This solution was allowed to spread and to harden by loss of solvent. After the film had spread to the edges of the tube and had hardened, the water was slowly removed by siphoning or pouring and the nitrocellulose film was left resting on the phosphor screen with a thin layer of water held between the film and the screen. After the tube had been dried with a slow air stream, the nitrocellulose film was ready to receive the aluminum deposit. After the aluminum was deposited, the tube was baked.

Although this procedure has proved commercially practical, it has certain disdvantages. When the solvent evaporates too rapidly, the film hardens more quickly in one spot than in another, and considerable differences in thicknesses of the final film often occur. Another disadvantage in the use of isoamyl acetate, alone, as a solvent, is that solutions of nitrocellulose in this solvent do not spread well on water. In order to make the solution spread better, a solvent, such as acetone, which is appreciably soluble in water, must also be added to the composition, but, if too much acetone is used, an irregular mass of precipitated nitrocellulose results. The nitrocellulose also precipitates if acetone, alone, is used. Although it is possible to prepare a solution containing isoamyl acetate and acetone in proportions such that the proper spreading characteristics are obtained, this type of solution cannot be kept very long without a good deal of trouble in its use. The highly volatile acetone evaporates rapidly whenever the container is uncapped and the solution gradually becomes more and more viscous. Even during the brief period consumed in the application of a few drops of solution to the water surface, viscosity of the solution changes appreciably. Thus, the flowing qualities of the solution change constantly and the use of the solution becomes difficult.

One object of the present invention is to provide an improved composition for spreading a film of nitrocellulose over a water surface.

Another object of the invention is to provide an improved composition for use in forming a stretched film of nitrocellulose over a relatively rough surface.

Another object of the invention is to provide an improved composition for forming a nitrocellulose film upon which a good light-reflecting film of aluminum is to be deposited.

Another object of the invention is to provide an improved nitrocellulose film-forming composition for use in a process of aluminizing the screen of a cathode-ray tube.

Another object of the invention is to provide an improved composition for the formation of a nitrocellulose film having a predetermined thickness and smoothness.

Still another object of the invention is to provide an improved method of forming a film of nitrocellulose suitable for aluminizing.

These and other objects will be more apparent and the invention will be more readily understood from the following description of preferred embodiments.

An essential feature of the present invention is the use of a film-forming composition comprising not more than 20% by weight nitrocellulose and the remainder solvent. The solvent is composed of three different types of ingredients. The first of these ingredients is a non-volatile, water-insoluble plasticizer for nitrocellulose. This ingredient is present in an amount equal to about $\frac{1}{10}$ to $\frac{1}{2}$ the weight of the nitrocellulose. The second solvent ingredient is a substantially water-insoluble solvent for the nitrocellulose. This solvent has a boiling point of between 150° and 250° C. and is present in an amount equal to about 2 to 4 times the weight of the nitrocellulose. The third solvent ingredient is a solvent for nitrocellulose having appreciable solubility in water. This ingredient may have relatively high volatility and constitutes the remainder of the composition.

*Example 1*

A preferred spreading composition may be made up by preparing a solution of nitrocellulose with the ingredients in the following proportions:

| Ingredient | Percent by Weight |
| --- | --- |
| Nitrocellulose, ½ sec | 10 |
| Dioctyl Phthalate | 2.5 |
| Octyl Acetate | 27.5 |
| Ethyl Acetate | 60 |

For use in the above composition, the nitrocellulose fiber, as received from the manufacturer, should be thoroughly washed with distilled water to remove all foreign matter. The washed material may then be broken up by stirring in a hot distilled water suspension with the water kept near the boiling point. The suspension may be filtered and rinsed with hot distilled water, after which it should be dried for several hours. This treatment is preferable in order to prepare films which are completely homogeneous and free of fine holes.

The selection of the proper viscosity grade of nitrocellulose is of some importance since this is one of the factors in determining the viscosity of the prepared solution. Although nitrocellulose having a viscosity grade of ½-second is preferred for the compositions of the present invention, material of lower viscosity grade can be used. For example, material having a viscosity of ¼-second is satisfactory and even lower viscosity grades, down to 33 c. p. s., form films having sufficient strength for the intended purpose. On the other hand, if dilute solutions of nitrocellulose are used, the viscosity grade may be increasingly higher, depending on the degree of dilution.

In developing the compositions for use in the present invention, it was found that the formation of nitrocellulose films suitable for making aluminized screens for cathode-ray tubes, in which the aluminum had a satisfactory reflecting surface, was influenced by a number of factors which will now be explained in more detail.

One of the factors which influences the formation of nitrocellulose films on a water surface is the spreading characteristics of the solution used to form the film. With some solvents, the area of spreading of a nitrocellulose solution applied dropwise to the water surface is too limited in extent for practical use. More extensive spread is prevented by the formation of a set or hardened edge, even though the main body of the film remains liquid for some time. This is the case when isoamyl acetate, alone, is used as a solvent for the nitrocellulose. It is necessary that the solvent used permit spreading of the nitrocellulose film over the entire area which it is desired to cover. In the case of cathode-ray tubes, the screen may have a diameter of anywhere from about 2 or 3 inches up to more than 20 and the composition used should preferably be one which can be utilized in either the smallest or the largest diameter tubes. Another complicating factor, however, is that the solvents used for the nitrocellulose must not cause the time required for hardening to be unduly long. If the hardening period is too long, the film remains highly fluid over a lengthy period. Motions in the water base produce swirls and other patterns, and sometimes cause open areas to form in the film.

After a nitrocellulose film is placed in a cathode-ray tube, it must be dried to remove all volatile constituents. This causes the film to shrink. If the film shrinks to much in area, it may pull loose from the screen. This is more likely to occur in regions where the tube is highly curved. In making up the improved compositions which are a part of the present invention, it was found that the percentage of shrinkage upon solidifying of the film could be controlled by use of the proper plasticizers in controlled amounts. It was also found that some shrinkage of the film is essential to produce the desired type of surface for aluminizing. A film which is not caused to shrink sufficiently will not be smooth enough to have a surface suitable for aluminizing. If aluminum is deposited upon a film which is not smooth enough, it will appear to be dark and will be of little value in reflecting light. In the making of aluminized screens, it has been found that the best aluminized films are formed when the nitrocellulose film shrinks about 10 per cent upon solidifying.

Another factor which must be carefully controlled during the process of film formation in cathode-ray tubes is the film thickness. Preferably, the film should have a fairly uniform thickness and the thickness must not be either too small or too large. If the nitrocellulose film is too thick, when it is baked out after aluminizing, air cannot gain complete access to the film and charring of the nitrocellulose occurs rather than complete burning. When charring occurs, the screen becomes darkened. If the film is too thin, of course it will be too fragile for easy handling. Experience has shown that the film should not be more than 2,000 Å thick nor should it be thinner than about 200 Å, although the absolutely lowest limit of film thickness is still lower than this figure. Although variations of thickness in the film are permissible, the film should be reasonably uniform. As a practical matter, the thickness portions of the film should preferably not be more than about 1,000 Å.

One of the essential features of the present invention is in the formulation of compositions which enable the above discussed factors in the method to be satisfactorily controlled. The solvent combination was selected to provide desired spreading characteristics for the film. In order to have the film spread over a sufficiently wide area, a solvent having a relatively high boiling point is desirable. As the boiling point of the solvent increases, the spreading area of the solution on an open dish of water increases. Octyl acetate has been found to have a sufficiently high boiling point to enable films to be spread over the area of the screen of the largest cathode-ray tubes in ordinary commercial use. Octyl acetate is not the only solvent which could be used for this purpose. Any water-insoluble solvent for nitrocellulose having a boiling point within the range of about 150° to 250° C. is suitable. Other typical examples are ethylbutyl acetate and ethylamyl acetate. If only this type of solvent is used, however, the time required for the film to harden is too long for practical purposes. As previously stated, if the hardening period is too long, imperfections may appear in the film, due to motion occurring in the water base. To retain the good spreading characteristics of the high boiling solvent and, at the same time, to have the film harden more quickly, it has been found desirable to use a certain proportion of a solvent which can be gotten rid of rapidly. This solvent may be one which evaporates rapidly when exposed to the air at ordinary temperatures or it may be one which is appreciably soluble in water, or it may be both highly volatile and water soluble. If water soluble, its solubility is preferably about 10–30 per cent by weight. When the film-forming solution is placed on the surface of the water, this solvent is quickly removed from the film, either by evaporation into the air or dissolving in the water, or both. This causes the film to set to a high viscosity quickly and prevents damage to the film due to any motion in the water. In the example previously given, ethyl acetate is the solvent which is rapidly removed from the spreading solution after the solution is applied to the water surface. Any other easily dispersed solvent for nitrocellulose can, however, be used equally well. Other examples are cyclohexanone, methyl isobutyl ketone and many other organic esters and ketones.

It will thus be seen that the combination of the two types of solvents is used, first, for the purpose of providing a solution having initially a viscosity low enough for applying from a dropper and for rapid spreading and, second, for the purpose of maintaining the viscosity of the film constant during the time the water cushion layer is being poured off. It will also be seen that the type of combination selected enables the film to spread properly, even over large areas, and yet to harden rapidly enough to prevent formation of imperfections of certain types. The amount of the non-volatile solvent may vary from about 2 to 4 times the weight of the nitrocellulose, and the easily dispersed solvent may be present in the amount of about 5 times the weight of the nitrocellulose or higher. This solvent may be used to dilute the compositions to almost any extent desired.

The function of the plasticizer in the present compositions is to control the percentage of shrinkage of the nitrocellulose film. It has been found that, as the percentage of plasticizer is increased, the percentage of shrinkage decreases.

As previously pointed out, a certain percentage of shrinkage is desirable in making nitrocellulose films suitable for aluminizing. Where the plasticizer is dioctyl phthalate, the ratio of plasticizer to nitrocellulose is about one-fourth in order to obtain a film shrinkage of about 10 percent. Although the one-fourth ratio is preferred, a certain range of proportions is permissible, depending upon the particular plasticizer selected. The range of plasticizer which may be used is from about one-tenth to one-half the weight of the nitrocellulose. For making nitrocellulose films suitable for aluminizing purposes, the plasticizer should be substantially insoluble in water. Otherwise, the water which serves as the spreading base will quickly leach it out of the thin film. Some plasticizers, such as dimethyl phthalate or camphor, for example, are too high in water solubility to function as film plasticizers for the present purpose. Although the plasticizer is also a solvent for the nitrocellulose, it may be distinguished from the other high boiling solvents used in these compositions. The plasticizers used herein cannot be removed from the film by blowing an air stream through the tube for a few minutes; i. e., 5 to 10 minutes. On the other hand, the high boiling solvents which are not termed plasticizers in these compositions are readily removed from the film in this manner. Suitable plasticizers, other than the one mentioned in Example 1, are dibutyl phthalate and triglycol dihexoate. These are merely additional examples of a fairly large number that could be used.

The thickness of the nitrocellulose film can be controlled by the amount of spreading solution of a given concentration used to cover a particular surface area. In using the composition of Example 1, when aluminizing a 4 or 5 inch tube, one drop from an average dropper is sufficient to form a film having a satisfactory thickness. A drop of this nature occupies a volume of about .05 ml. For a 7 inch tube, two drops are required and six drops are required for a 12 inch tube. Using these amounts, the thickest portions of the film which is formed will be about 1,000 Å in thickness and the thinnest portions will still be safely above the minimum which is desirable.

Another example of composition suitable for forming a nitrocellulose film for aluminizing is as follows:

*Example 2*

| Ingredient | Percent by Weight |
|---|---|
| Nitrocellulose, ¼ sec. | 10 |
| Dioctyl Phthalate | 2.5 |
| Octyl Acetate | 27.5 |
| Mesityl Oxide | 50 |
| Propanol | 10 |

In this example, the propanol may be omitted entirely, if desired. The mesityl oxide has been found to produce good results as the easily dispersed solvent because of its relatively low volatility. One of its particular advantages is that, due to its lower volatility, the shelf life of the solution is lengthened. It disappears from the film quickly, however, due to its water solubility.

The compositions which are a part of the present invention may be used for forming films as described. More specifically, a particular example of a method of forming a film is as follows: A tube, after having its phosphor screen applied, is dried and placed on a pouring table. Without wetting the sides of the bulb, water is poured into the tube to form a spreading base. For a short 4 inch tube, about 50 cc. of water are desirable. For a short 12 inch tube, 1,000 cc. may be used and, for the long 12 inch variety, 1,500 cc. are suitable. One or more drops of the film solution are then delivered about 1 cm. above the water surface. If more than one drop is used, the drops should be delivered not slower than one or two per second in order to make uniform films. After one or two minutes, the neck of the tube is tilted to begin the pouring action, and a siphon is inserted beneath the film. As the tube is tilted, water is removed through the siphon. The rate of pouring should be slow enough so that the area of the screen from which the water meniscus has just receded is not glossy. As pouring progresses, the speed may be increased. The pouring should normally take 8 to 12 minutes, depending upon tube size and face contours. After pouring, the tube should be left for a few minutes with the face nearly vertical to encourage drainage of the water layer between the film and the screen. Next, the film is dried in a slow air stream to evaporate the high boiling solvent which is present and to dry the tube in preparation for aluminizing.

There has thus been described an improved method of forming a smooth surfaced film of nitrocellulose over a relatively rough surfaced material. An essential part of the method is the use of improved solutions for spreading the nitrocellulose film which will automatically maintain the viscosity of the film constant at a desired value during the period of pouring off the water from beneath the film. The use of a phosphor screen is not an essential factor in making the films of the present invention. In fact, no other film need be present at all beneath the nitrocellulose film.

I claim as my invention:

1. A film-spreading composition consisting essentially of nitrocellulose and liquid in which said nitrocellulose constitutes not more than about 20% by weight and said liquid constitutes the remainder and in which the liquid consists essentially of (1) a substantially non-volatile, water-insoluble plasticizer for said nitrocellulose, present in an amount of about $\frac{1}{10}$ to $\frac{1}{2}$ the weight of said nitrocellulose, (2) of substantially water-insoluble solvent selected from the class consisting of octyl acetate, ethyl butyl acetate and ethyl amyl acetate in an amount equal to about 2 to 4 times the weight of the nitrocellulose, and (3) a solvent selected from the class consisting of ethyl acetate, cyclohexanone and methyl isobutyl ketone constituting the remainder.

2. A composition according to claim 1 in which said nitrocellulose constitutes about 10% and said liquid about 90% of the composition.

3. A composition according to claim 1 in which said plasticizer is dioctyl phthalate.

4. A composition according to claim 3 in which said dioctyl phthalate is present in the amount of about $\frac{1}{4}$ the weight of said nitrocellulose.

5. A composition according to claim 1 in which said water-insoluble solvent is octyl acetate.

6. A composition according to claim 5 in which said octyl acetate is present in an amount equal to about 2.75 times the weight of said nitrocellulose.

7. A composition according to claim 1 in which said third solvent ingredient is ethyl acetate.

8. A film-spreading composition consisting essentially in per cent by weight of nitrocellulose 10%, dioctyl phthalate 2.5%, octyl acetate 27.5%, and mesityl oxide 60%.

9. A method of forming a stretched film of nitrocellulose within a vessel comprising covering the bottom of the vessel with a layer of water, floating on the surface of said water layer a solution consisting essentially of not more than about 20 percent nitrocellulose by weight and the remainder a liquid mixture which is constituted as follows: (1) a substantially non-volatile, water-insoluble plasticizer for said nitrocellulose in an amount equal to about $\frac{1}{10}$ to $\frac{1}{2}$ the weight of said nitrocellulose, (2) a substantially water-insoluble solvent for said nitrocellulose having a boiling point of about 150° to 250° C., present in an amount equal to about 2 to 4 times the weight of said nitrocellulose, and (3) a nitrocellulose solvent which is readily removable from said solution as it spreads over said water surface, permitting said solution to spread over said water surface to form a thin layer, permitting said solvent which is readily removable to leave said solution whereby to cause said solution to partially set to form a thin film, removing said water layer from beneath said film, and rapidly evaporating said water-insoluble solvent ingredient from said film.

10. A method according to claim 9 in which said plasticizer is dioctyl phthalate, said water-insoluble solvent is octyl acetate and said easily removable solvent is ethyl acetate.

11. A method according to claim 10 in which said dioctyl phthalate is initially present in said solution of nitrocellulose in an amount of about 2.5% by weight, said octyl acetate is initially present in an amount of about 27.5% by weight and said ethyl acetate is present in an amount of about 60% by weight.

References Cited in the file of this patent

UNITED STATES PATENTS

| Number | Name | Date |
|---|---|---|
| 826,781 | Gregory | July 24, 1906 |
| 1,309,981 | Clarke | July 15, 1919 |
| 1,434,634 | Sease | Nov. 7, 1922 |
| 1,653,010 | Humphrey | Dec. 20, 1927 |
| 1,702,181 | Van Schaack | Feb. 12, 1929 |
| 2,015,077 | Lawson | Sept. 24, 1935 |
| 2,064,802 | Edgar | Dec. 15, 1936 |
| 2,086,714 | Hucks | July 13, 1937 |
| 2,088,052 | Ensminger | July 27, 1937 |
| 2,098,534 | Church | Nov. 9, 1937 |
| 2,485,372 | Farrell | Oct. 18, 1949 |
| 2,562,373 | Arnold | July 31, 1951 |
| 2,631,334 | Bailey | Mar. 17, 1953 |

FOREIGN PATENTS

| Number | Country | Date |
|---|---|---|
| 387,534 | Great Britain | Feb. 9, 1933 |
| 217,455 | Switzerland | Feb. 16, 1942 |

OTHER REFERENCES

Simonds et al.: "Handbook of Plastics," 1943, pp. 244, 245 and 248.